No. 611,224. Patented Sept. 20, 1898.
M. W. SHANNON.
BUNG.
(Application filed May 5, 1897.)
(No Model.)

Witnesses
A. L. Whiting
M. C. Price

Inventor
Maurice W. Shannon
By his Attorney
Rufus B. Fowler

THE NORRIS PETERS CO., PHOTO-LITHO., WASHINGTON, D. C.

UNITED STATES PATENT OFFICE.

MAURICE W. SHANNON, OF WORCESTER, MASSACHUSETTS.

BUNG.

SPECIFICATION forming part of Letters Patent No. 611,224, dated September 20, 1898.

Application filed May 5, 1897. Serial No. 635,173. (No model.)

*To all whom it may concern:*

Be it known that I, MAURICE W. SHANNON, a citizen of the United States, residing at Worcester, in the county of Worcester and State of Massachusetts, have invented a new and useful Improvement in Bungs, of which the following is a specification, reference being had to the accompanying drawings, forming a part of the same, in which—

Figure 1:
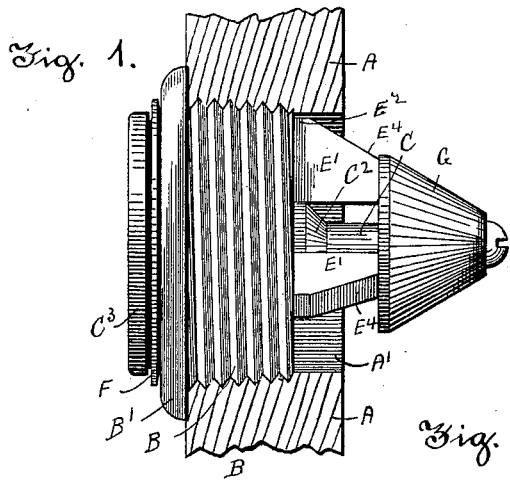
Figure 2:
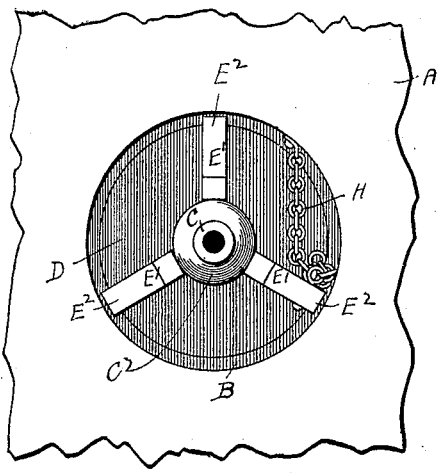
Figure 3:
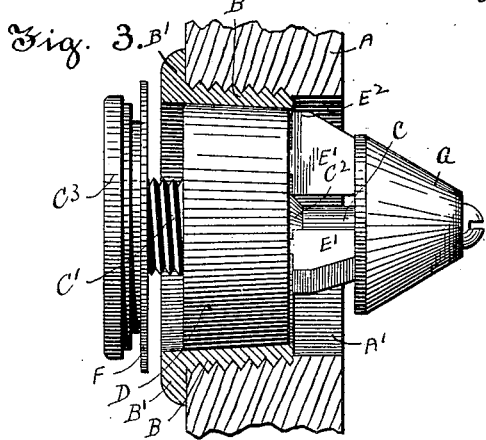
Figure 6:
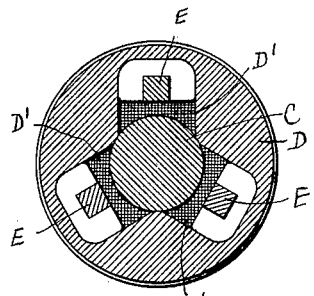
Figure 4:
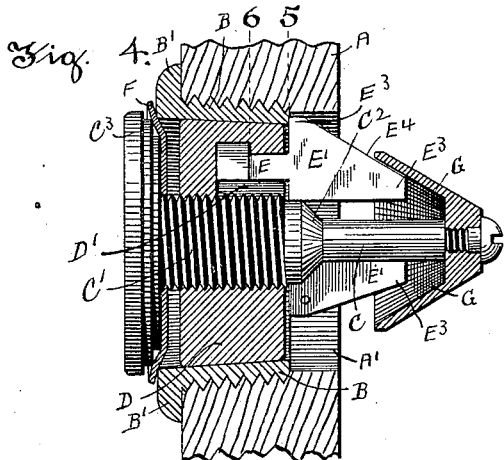
Figure 5:
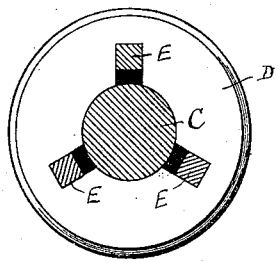

Figure 1 represents a view of the bung inserted in a barrel, a portion of the barrel being shown in sectional view. Fig. 2 is a bottom view of the bung as seen from the interior of the cask. Fig. 3 represents my improved bung with the retaining-clamps withdrawn in position to be removed from the cask. Fig. 4 represents the bung inserted in the barrel, with portions of the bung shown in central sectional view. Fig. 5 is a transverse sectional view on line 5, Fig. 4; and Fig. 6 is a transverse sectional view on line 6, Fig. 4.

Similar letters refer to similar parts in the different figures.

My present invention relates to a bung for closing the orifice in casks, barrels, or other receptacles; and it consists in the construction and arrangement of parts, as hereinafter set forth, and described in the annexed claims.

In Figs. 1 to 4, A denotes a portion of one of the staves of a barrel or cask, having a circular orifice A', with preferably a metallic collar B screwed into the orifice and provided with a flange B', overlapping the outside of the barrel, said collar forming a metallic bushing to receive the bung. My improved bung comprises a spindle C, having a screw-threaded section C' and a tapering section $C^2$ and provided with a circular head $C^3$, larger than the opening in the metallic collar B. The screw-threaded section C' carries a cylindrical nut D, provided with radial T-shaped grooves D' to receive the T-shaped shanks E of the clamping-plates E', which connect the plates E' with the nut D and permit a radial movement of the plates therein, so that as the spindle C is screwed into the nut D the tapering section $C^2$ will crowd the plates E' outward, carrying the outer corners $E^2$ of the plates over the edge of the metallic collar B, thereby holding the nut from being moved out of the collar B and causing the head $C^3$ to be brought down against an elastic gasket F, inserted between the head $C^3$ and the flange B' of the collar in order to effectually close the joint.

G denotes a hollow conical shell which is attached to the end of the spindle C and incloses the tips $E^3$ of the clamping-plates E'. As the spindle C is unscrewed the head $C^3$ is raised from the flange B', as shown in Fig. 3, and the conical shell G is drawn over the tapering edges $E^4$ of the clamping-plates E', so that as the tapered section $C^2$ of the spindle is withdrawn from between the plates E' they will be moved radially toward the center of the spindle, thereby drawing the outer points $E^2$ of the clamping-plates within the interior diameter of the metallic collar B, allowing the bung to be removed from the cask. In order to prevent the nut D from rotating and also to permanently attach the bung to the cask, I employ a chain H, Fig. 2, to connect one of the plates E' with the barrel.

I have shown my improved bung as used in connection with a metallic collar or bushing B; but the collar B can be omitted, if desired, making the bung of the proper size to fit the orifice in the cask, with the head $C^3$ overlapping the staves of the barrel and the corners $E^2$ of the clamping-plates E' engaging the inner surface of the barrel instead of the edge of the metallic collar B.

My improved bung is not confined in its use to casks or barrels, but it may be employed as a stopper for any receptacle provided with an interior surface which can be engaged by the clamping-plates E'.

What I claim as my invention, and desire to secure by Letters Patent, is—

1. In a bung, or stopper, the combination of a nut adapted to be inclosed in the orifice of a cask and held from turning therein, a screw-threaded spindle engaging said nut and provided with a head integral with said spindle and adapted to overlap the outside of the cask, radially-expanding plates carried by said nut and operatively connected with said spindle for engaging the inner side of the cask, whereby said nut is held from outward movement, substantially as described.

2. In a bung, or stopper, the combination of a nut adapted to be inclosed within the orifice of a cask and held from rotation therein, radially-moving plates carried by said nut and provided with shoulders adapted to engage the inner side of the cask and hold said nut from outward movement, a screw-threaded spindle in said nut provided with a tapered section by which said plates are crowded outwardly, a head carried by said spindle and arranged to overlap the outer side of the cask, whereby said head is drawn against the outside of the cask and the shoulders of said plates are drawn against the inner side of the cask as the spindle is screwed into said nut, substantially as described.

3. In a bung, or stopper, the combination of a nut D provided with T-shaped grooves D', plates E having T-shaped shanks E', held in said grooves and provided with shoulders E² adapted to engage the inside of the cask, a screw-threaded spindle held in said nut and provided with a head C³ and a tapering section C², by which said plates are crowded radially outward, substantially as described.

4. In a bung or stopper the combination of a nut adapted to be inserted in the orifice of a cask, clamping-plates connected with said nut and capable of an outward movement to engage the interior of the cask, a screw-threaded spindle engaging said nut, a head carried by said spindle and arranged to overlap the outer surface of the cask and a hollow cone attached to said spindle and inclosing the ends of said clamping-plates whereby they are withdrawn from the cask by the rotation of said spindle, substantially as described.

5. In a bung, or stopper, the combination of a nut adapted to be inclosed in the orifice of a cask, means for holding said nut from rotation, a screw-threaded spindle held in said nut, plates carried by said nut capable of a radial movement and adapted to positively engage the inner side of the cask and hold said nut from outward movement, a screw-threaded spindle engaging said nut and operatively connected with said radially-moving plates, whereby they are engaged and disengaged from said cask, and a head carried by said spindle overlapping the outer side of the cask, substantially as described.

Dated this 1st day of May, 1897.

MAURICE W. SHANNON.

Witnesses:
RUFUS B. FOWLER,
M. C. PRICE.